Oct. 16, 1934.   K. V. NESSELMANN   1,976,800
ABSORPTION REFRIGERATING SYSTEM
Filed April 11, 1931   3 Sheets-Sheet 1
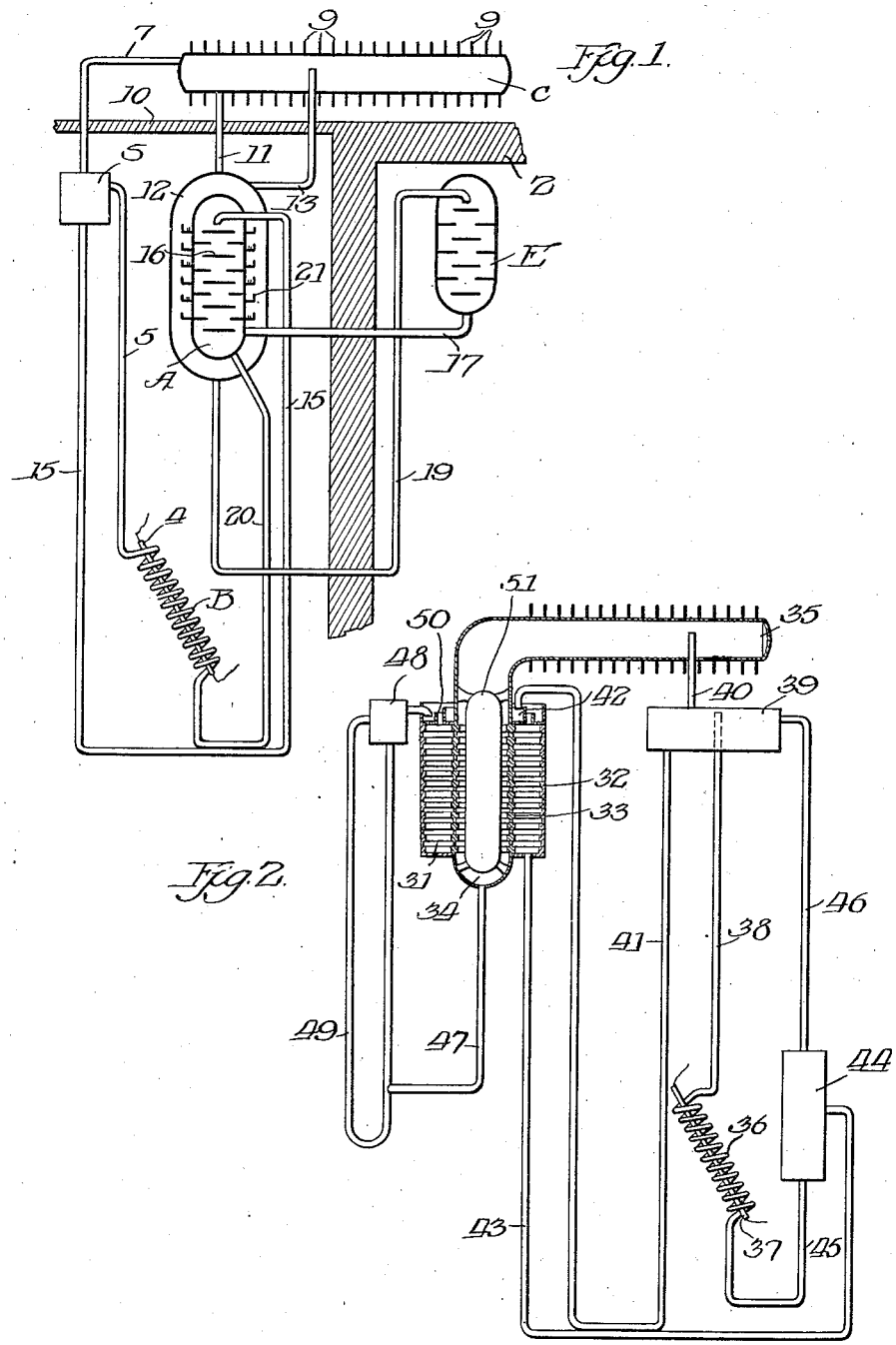
Inventor
Kurt V. Nesselmann.
By Harry S. Dumars
Atty
Witness
R. B. Davison

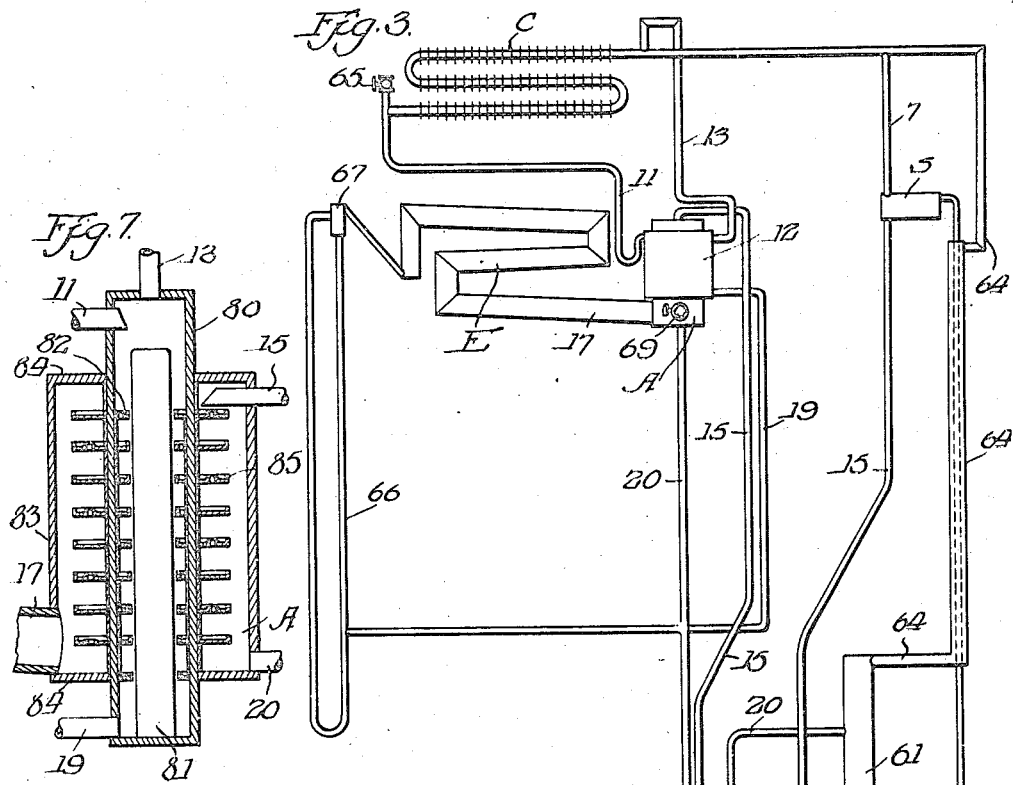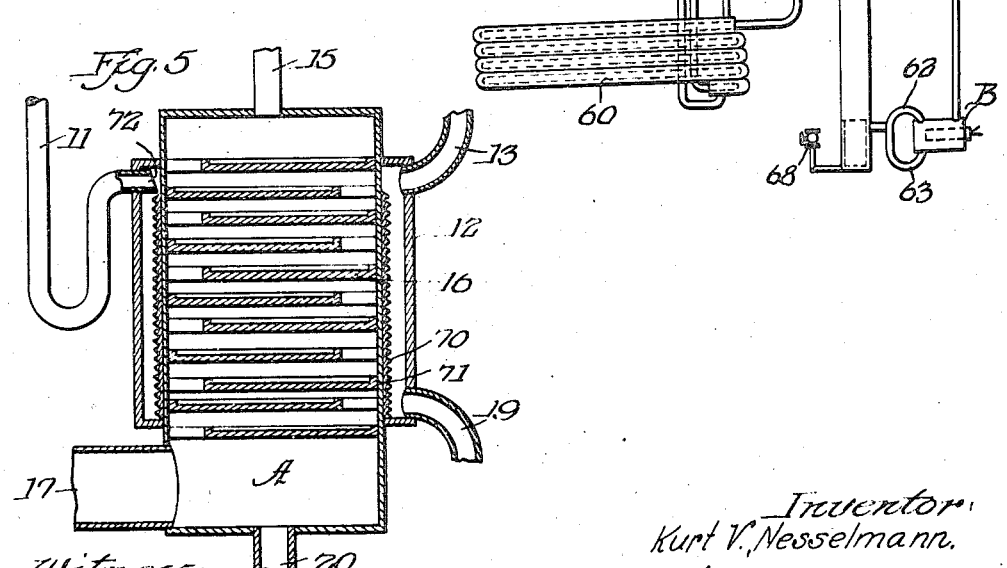

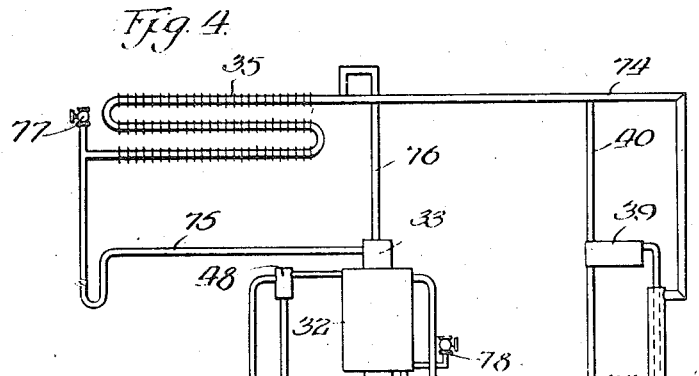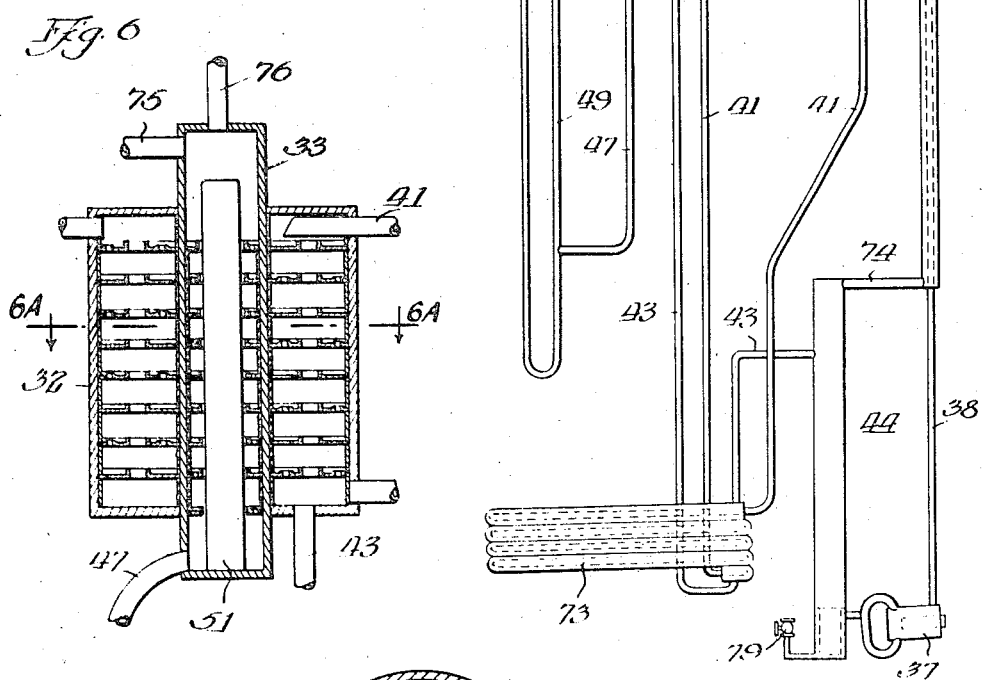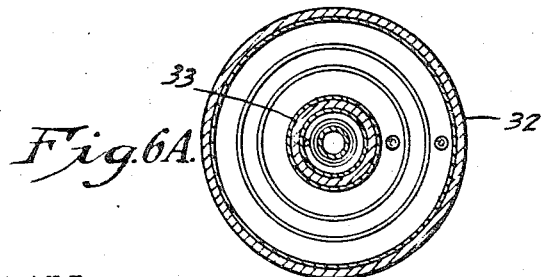

UNITED STATES PATENT OFFICE 1,976,800

ABSORPTION REFRIGERATING SYSTEM

Kurt V. Nesselmann, Berlin-Siemensstadt, Germany, assignor, by mesne assignments, to The Hoover Company, North Canton, Ohio, a corporation of Ohio Application April 11, 1931, Serial No. 529,376
In Germany April 12, 1930

9 Claims. (Cl. 62—119)

This invention relates to absorption refrigerating apparatus and more particularly to apparatus adapted for household refrigerators in which the absorber and the condenser are air-cooled.

In attempting to develop air cooled absorption refrigerating apparatus of the household type considerable difficulty has been experienced because of the necessity for confining the apparatus to a limited space at the side or back of the cabinet. This offers no serious problem as to the condenser which may be located on top of the refrigerator cabinet where air may freely circulate thereover but, in certain types of systems it is necessary that the absorber be rather definitely located with respect to other parts of the system and this location is not always such as to readily adapt it to be air cooled without employing a fan or the like.

Thus it is found that in the case of a "columnar" refrigerating systems such for example as are disclosed in Altenkirch Patent No. 1,728,742 issued September 17, 1928 for "Refrigerating apparatus of the absorption type" and in the case of "diffusion" systems such as that disclosed in the copending application of Edmund Altenkirch, Serial No. 501,519, filed December 11, 1930 for "Continuous absorption machines" the absorber must be located rather definitely with respect to the evaporator. Considerable difficulty has, therefore, been experienced in attempting to air cool the absorber since it must be located at a point where air cannot freely circulate around it.

An object of the present invention is to provide a continuously operating absorption system of the kind mentioned in which heat is carried away from the absorber by means of liquid which is brought into heat transfer relation with the absorber and subsequently gives up heat to the air.

A further object is to provide for the flow of liquid refrigerant from the condenser into heat transfer relation with the absorber and from the absorber to the evaporator under the influence of gravity so that a portion thereof may evaporate and cool the absorber.

Other objects and advantages will be set forth in the following description which should be considered in connection with the accompanying drawings in which, Fig. 1 is a diagrammatic representation illustrating the more fundamental principles of the invention, Fig. 2 is a diagrammatic illustration of a modification thereof, Fig. 3 is a view in side elevation of an actual working machine in which the principle of the present invention is utilized and which follows somewhat the showing of Fig. 1, Fig. 4 is a view in side elevation of another actual working apparatus which illustrates an apparatus constructed along the lines of the diagrammatic showing of Fig. 2, Fig. 5 is a cross sectional view of the absorber, and the cooling means therefor, shown in Fig. 3, Fig. 6 is a cross sectional view of the absorber and the cooling means therefor of the construction shown in Fig. 4.

Fig. 6-A is a cross sectional view of the device of Fig. 6, taken on the line 6A—6A thereof.

Fig. 7 is a cross sectional view of a modified form of absorber which may be substituted for the form shown in Fig. 3.

In the drawings, machines which operate both on the columnar principle and on the diffusion principle, are shown. Thus in Figure 1, one is shown in which no inert or neutral gas is employed and yet in which all of the parts are in open communication with one another, the difference in pressure necessary for condensing and evaporating the refrigerant at relatively high and low temperatures respectively, being maintained solely by means of liquid columns. In Figure 2, liquid columns are also employed for maintaining some difference in total pressure between fluids in certain of the vessels but an inert neutral gas is also employed for maintaining a difference in refrigerant partial pressure between certain of the vessels.

Referring to Figure 1, a portion of a refrigerator cabinet is diagrammatically illustrated at 2, the cabinet separating certain parts of the apparatus from one another. Essentially the system consists of a boiler B, a gas separating chamber S, a condenser C, an absorber A and an evaporator E, these parts being connected by suitable conduits as shown for conducting fluid from one to another as will appear from the description hereinafter.

The boiler may consist of a coil of small pipe as illustrated, adapted to be heated by an electric cartridge heater indicated at 4. A conduit 5 of sufficiently small size to act as a gas lift pump connects the boiler spiral to a gas separating chamber 6 from which a gas conduit 7 conveys gas to the condenser C which may be located above the cabinet as shown and provided with cooling fins 9 for radiating heat to the atmosphere. The condenser C may be separated from the remainder of the apparatus by a relatively thin portion 10 of the cabinet. For draining condensate from the condenser a pipe 11 is connected to the bottom thereof and to a vessel or jacket 12 which surrounds the main body of the absorber A and which is located beneath the portion 10 of the cabinet. Another conduit 13 adapted to carry gas, also connects the jacket 12 of the absorber and the condenser, the upper portion of the conduit terminating in the upper part of the condenser. As diagrammatically illustrated in Figure 1, the absorber A may be entirely enclosed by the jacket 12.

Weak absorption solution is conveyed to the upper portion of the absorber from the gas separating chamber 6 by the conduit 15. The solution is distributed over baffle plate 16 inside the absorber and thus picks up or absorbs refrigerant coming from the evaporator E thru the conduit 17 this conduit being connected to the lower portion of the evaporator and to the absorber. A U-shaped conduit 20 which may have a portion in heat exchange relation with a portion of the conduit 15, as illustrated, carries the enriched absorption solution from the absorber A back to the boiler coil.

On the outside of the absorber vessel A but inside of the jacket 12, a number of ring shaped trays or plates 21 are provided for catching and providing pools of liquefied refrigerant as it flows from the condenser C thru the conduit 11. Because of the fact that the absorber A is warmer than the condenser C, liquid refrigerant condensed in the condenser C may evaporate from the trays 21 and in so doing takes up heat from the absorber. The refrigerant vapor produced in this manner goes back through the tube 13 into the condenser while the unevaporated part collects in the lower portion of the vessel 12 and flows from there through the U-tube 19 into the top part of the evaporator. Due to the fact that the evaporator must be at a lower pressure than the condenser in this type of apparatus, the design must be such that the column of liquid formed in the conduit 19 is of sufficient height to prevent the passage of gas from the condenser into the evaporator. That is, the design must be such that the pressure in the evaporator plus the pressure due to the liquid head in the right hand leg of the conduit 19, as viewed in Figure 1, must equal the pressure in the condenser and in the jacket 12 plus that due to the head in the left hand leg of this conduit 19. In Figure 1 the showing is only diagrammtic and is not drawn to scale with an actual refrigerating system. This figure illustrates only the principle of the invention, an actual design in accordance with this principle being shown in Figure 3.

In accordance with the principle illustrated in Figure 1, it is possible to properly cool the absorber without the use of cooling water in spite of the fact that the absorber must be located at a point inconvenient for air cooling. The condenser which can be disposed at any desired place and which can be so dimensioned as to provide a large heat radiating surface functions as part of the means for cooling the absorber. The heat given off by the absorber is taken up largely due to the heat of vaporization of the liquid refrigerant in the jacket 12, and as the vaporized portion of the refrigerant is returned to the condenser thru the conduit 13 this quantity of heat is given off to the surrounding atmosphere by the cooling fins 9 on the condenser. Some heat of absorption my also be dissipated from the liquid conduit 19.

Figure 2 illustrates a modified form of the invention in which the necessary difference in the refrigerant pressure between the condenser and the evaporator is maintained partly by liquid columns and partly by the use of an inert gas as a pressure equalizing medium. The absorber and the evaporator are here shown as part of a single vessel made of two concentric cylinders 32 and 33. This evaporator-absorber vessel may be constructed in a manner somewhat similar to the corresponding arrangement of my copending application, Serial No. 501,519 filed December 11, 1930 for "Continuous absorption machine". By means of the cylinders 32 and 33 a space 31 is provided. Evaporation of the refrigerant takes place on the inside of the outer wall 32 so that this wall may be termed the evaporator. Refrigerant is absorbed on the outer wall of the inner cylinder 33 which may be termed the absorber and which is cooled by refrigerant liquid trickling down the inner wall of the inner cylinder. Thus the evaporator-absorber vessel of Figure 2 is made up of two concentric cylinders with means for causing liquid refrigerant to trickle down one wall and absorption liquid to trickle down the other. The space 34 on the inside of the inner cylinder corresponds to the jacket 12 of Figure 1 insofar as the cooling of the absorber is concerned. This space is connected to an air cooled condenser 35 located above the remainder of the apparatus and which may be on top of the box or cabinet as illustrated in Figure 1.

As refrigerant condenses in the condenser 35 it flows into the space 34 where a portion of it is evaporated and returned to the condenser 35 while the remainder passes on to the evaporator.

For generating or boiling the refrigerant out of the absorption solution an arrangement similar to Figure 1 may be employed but in Figure 2 a somewhat different construction is diagrammatically illustrated. As shown the boiler or generator may consist of a coil 36 provided with an electric heating element 37. The coil 36 has its upper end connected to a tube 38 which is of sufficiently small diameter to act as a gas lift pump for conveying absorption liquid into the gas separating chamber 39. A gas conduit 40 connects the gas separating chamber 39 to the upper part of the condenser 35 while a U-tube or conduit 41 conducts the weak absorption liquid from the separator to the absorber. From the absorber the enriched absorption liquid is returned to the boiler 36 by a tube 43 which may have a portion in heat exchange relation with the tube 41, a reservoir vessel 44 and a conduit 45. The reservoir is connected to the gas separating chamber by a conduit 46 thru which gas may flow to equalize the pressure in the reservoir and the gas separating chamber 39.

As explained above upon the refrigerant conveyed to the condenser 35 being liquefied it flows downwardly thru the cooling space 34 and out at the bottom of the inner cylinder of the absorber evaporator vessel, the outlet conduit being shown at 47. This conduit is connected by means of a U-pipe 49 and a small reservoir vessel 48 to the evaporator, which in this case is the inner side of the outer cylinder 32.

As diagrammatically illustrated in Figure 2 the walls of the evaporator and absorber vessel as well as the inner wall of the inner cylinder of this structure should be so designed that liquid will slowly trickle down thereover. This may be accomplished merely by roughening the surfaces or providing surfaces having grooves or knurls thereon or by the arrangement described in my copending application 501,519 referred to above. In some cases it may be necessary to provide means for distributing the liquids onto these surfaces and in Figure 2 annular vessels or rings 42 and 50 are shown for distributing the liquid refrigerant and the absorption solution onto their respective surfaces. These rings may be provided with small slits at the proper points to aid in distributing the liquid. On the inside of the inner cylinder of the absorber-evaporator vessel and disposed centrally in the cooling space 34 a cylindrical body 51 is provided for occupying a large part of the space 34 so as to prevent the accumulation of a great amount of liquid refrigerant therein. Thus should the condensate or liquid refrigerant in the tube 47 rise higher than usual on account of some fluctuations in temperature in certain parts of the apparatus no great amount of liquid refrigerant will collect in this space.

Like conduit 19 of Figure 1, the conduit 47, U-pipe 49 and vessel 48 provide means for maintaining a certain difference in total pressure between the condenser and the evaporator without permitting the passage of gas from one to the other. A liquid column is formed in the conduit 49 which balances the pressure difference between that in the absorber and evaporator vessel and that in the condenser 35. In addition to the pressure difference due to this liquid column, however, an inert auxiliary gas is placed in the absorber evaporator vessel and in accordance with known laws exerts its partial pressure independently of the refrigerant so that the vapor pressure of the refrigerant in this vessel is less than the refrigerant pressure in the other parts of the apparatus by an amount equal to the partial pressure of the inert gas plus the pressure due to the liquid column.

Since the evaporator and absorber walls of the evaporator-absorber structure are disposed only a short distance from each other, it is unnecessary to circulate the neutral gas therein. The refrigerant vaporized on the evaporator surface flows by diffusion thru the quiet neutral gas to the opposite absorption surface.

As in Figure 1, Figure 2 does not show the dimensions of an actual working machine but is only intended to illustrate the principle of the invention. Figures 3 and 4 illustrate the construction of actual apparatuses. Figures 5 and 6 illustrate details of these constructions and Figure 7 illustrates a possible modification of Figure 3. In these figures the parts similar to those of Figures 1 and 2 are similarly designated.

Referring first to Figures 3 and 5 an arrangement for carrying out the invention illustrated in Figure 1 is shown. That is, the system of Figure 3 illustrates a continuously operable columnar machine in which no inert or neutral gas is employed but in which the parts are in open communication with one another. As in Figure 1 the essential elements are a boiler B, gas separating chamber S, condenser C, absorber A and an evaporator E. As in Figure 1 the boiler is connected to the gas separating chamber by a small pipe 5 which acts as a gas lift pump. Vaporous refrigerant is conveyed from the gas separating chamber S to the condenser C by the pipe 7 and as the vapor condenses in the condenser it flows thru the pipe 11 into the jacket 12 around the absorber and thru the conduit 19 to the evaporator. As refrigerant is vaporized in the jacket 12 it is returned to the condenser thru the pipe 13. Absorption liquid is circulated between the boiler, gas separating chamber and absorber by means of the pipes 5, 15 and 20, portions of the pipes 15 and 20 being in heat exchange relation, a conventional heat exchanger 60 being illustrated for this purpose.

In addition to the elements shown in Figure 1, Figure 3 illustrates a system in which the conduit 20 does not go directly to the boiler but is connected to a receiving vessel or reservoir 61 which is connected to the boiler by two pipes 62 and 63 and to the conduit 7 above the gas separating chamber by a gas conduit 64 a portion of which surrounds the gas lift pump conduit 5 as illustrated. The pipes 62 and 63 function to prevent violent boiling in the boiler B from causing surges in the flow of absorption liquid. These pipes are more fully described and claimed in the copending application of Kurt Hahnel Serial No. 377,028, filed July 9, 1929 for "Aborption machines".

In addition to the changes noted above it will be seen that the condenser C of this figure is not a large vessel as in Figure 1 but consists of a small size of pipe which is reversely bent (or which may be coiled) and which is provided with a large number of heat radiating fins. The pipe 11 which connects the condenser to the jacket 12 of the absorber is provided with a U-bend at a point near the place where it enters the jacket. This pipe is also provided with a valve 65, the purpose of which will be explained hereinafter.

Other changes, it will be noted, reside in the evaporator which consists of sections of pipe instead of a vertical cylindrical vessel, these sections being welded together or connected by vertical sections and the lower portion functioning like the conduit 17 of Figure 1.

It will also be seen that a U-pipe 66 and small vessel 67 have been provided in this structure, these devices functioning like the U-pipe 49 of vessel 48 of Figure 2 in cooperation with the pipe 19 in maintaining a proper liquid column head and pressure difference between the evaporator E and the condenser C.

As indicated above this apparatus is designed for producing refrigeration without the use of an inert auxiliary gas. To this end, if the apparatus is made of suitable acid resisting material such as glass, such as is disclosed in my Patent No. 1,728,742, sulphuric acid and water may be used in the absorption liquid and refrigerant, respectively. The apparatus shown is particularly designed however, for the use of a mixture of sodium hydroxide and potassium hydroxide and water, and may be made of stainless steel. The ingredients may be mixed in the following proportions: 25 parts of sodium hydroxide, 25 parts potassium hydroxide and 50 parts of water by weight. The system operates at a pressure less than atmospheric. Accordingly, as an initial operation, gas must be removed therefrom. Also it is sometimes necessary to remove gas from the apparatus during operation due to the formation of gas therein. Valve 65 is provided for this purpose. Other valves 68 and 69 located at the bottom of reservoir 61 and on the absorber are provided for supplying liquid to the apparatus and for varying the quantity of fluids therein during operation.

The absorber and the cooling jacket construction of Figure 3 is illustrated by an enlarged cross sectional view of Figure 5. The general arrangement is similar to that illustrated by Figure 1 except that the baffle plates 16 in the absorber consist of segment shaped portions of a disk which are provided with a small flange around their periphery for retaining liquid. The jacket 12 does not surround the entire absorber but only the portion opposite the baffle plates. For cooling the absorber a piece of pipe 70 having its outer surface threaded to provide grooves in the same is fitted over and welded or otherwise secured to the cylindrical wall 71 of the absorber and inside the jacket 12. The end of the pipe 11 which extends into the jacket 12 provides means for distributing condensate upon the threaded piece of pipe 70 as illustrated at 72.

Referring now to Figures 4 and 6 an actual working apparatus is illustrated built in accordance with the principles of Figure 2. Like Figure 2 the essential parts of Figure 4 are the boiler 36, a gas lift pump 38 connected to the boiler and to the separator 39, a condenser 35 and an absorber-evaporator vessel, parts of which are designated 32, 33 and 51. Refrigerant gas generated in the boiler 36 passes thru the conduit 38, gas separating chamber 39 and conduit 40 into the condenser 35. From the condenser it flows into the space on the inside of the inner pipe of the absorber-evaporator vessel and from there thru the conduit 47 into the U-pipe 49 and vessel 48 to the evaporator surface on the inside of the cylinder 32. Absorption liquid is conveyed from the separator 39 thru the pipe 41 into the absorber where it trickles down over the outside of the inner pipe 33, over the baffles thereon as shown in Figure 6 and back to the boiler thru the conduit 43 and receiver or reservoir 44, a portion of the conduit 43 being in heat exchange relation with the conduit 41 as indicated by the conventional heat exchange 73. A conduit 74 connects the top of the reservoir 44 to the conduit 40 connecting the gas separating chamber to the condenser, a portion being in heat exchange relation with the gas lift pump conduit 38.

As in Figure 3 the condenser consists of a coil or piece of reversely bent pipe instead of a large vessel. The condenser is connected to the cooling means for the absorber by pipe 75 provided with a U-bend and a pipe 76 which functions like the conduit 13 of Figure 1 to convey gas from the cooling means for the absorber back to the condenser.

The refrigerant and absorption liquid suggested for Figure 3 may be used in this apparatus but as is obvious from the above explanation an inert gas such as air or hydrogen is also provided in the evaporator-absorber vessel. With a mixture consisting of 25 parts of sodium hydroxide by weight, 25 parts of potassium hydroxide and 50 parts of water, the system may be operated with the evaporator and absorber at an absolute pressure equal to a head of from six to ten centimeters of water while the separator and condenser are at a pressure of from thirty to forty centimeters of water.

Due to the fact that the arrangement of Figure 4 like that of Figure 3 is dependent upon the maintenance of total pressure which are relatively low, (being less than atmospheric in the evaporator and absorber,) it is necessary to remove gases from the apparatus when it is initially started. Also in some cases, gases are generated during operation and it is then necessary to remove them. To this end the valve 77 is provided in the conduit 75. Valves 78 and 79 are also provided at convenient places as for example on the absorber-evaporator vessel and the lower end of the reservoir 44 for the purpose of charging the apparatus and to permit removal of liquid therefrom to properly trim it.

Figure 7 illustrates a modified form of absorber suitable for use in connection with the apparatus of Figure 3. In this figure the absorber proper and the cooling means therefor, are reversed. That is the absorber surrounds a portion of the cooling chamber. As illustrated the structure consists of a central cylindrical vessel 80 provided with a closed inner cylinder 81 for taking up space therein and having a number of annular baffle plates 82 secured to the wall thereof. The conduit 11 conveys refrigerant from the condenser into the inert cylindrical cooling chamber. As shown, the absorber proper consists of a cylindrical body 83 having annular end pieces 84 welded or otherwise secured thereto and to the wall 80 of the cooling chamber. A number of annular baffle plates 84 are secured to the outside of the cooling chamber wall 80 so as to provide space for retaining absorption liquid thereon to absorb refrigerant gases coming from the evaporator thru the conduit 17.

Various other changes and substitutions may be made to adapt the apparatus to any given conditions without departing from the spirit of the invention or the scope of the annexed claims.

I claim:

1. In a continuously operable absorption refrigerating system the combination of a condenser, an absorber, an evaporator, means for maintaining the condenser at a higher pressure than the evaporator, means operable in response to said higher pressure for conveying liquid refrigerant from the condenser to the evaporator and for causing the same to pass in heat exchange relation with the absorber as it passes from the condenser to the evaporator whereby a portion of the refrigerant is evaporated by heat from the absorber and means for returning the evaporated portion to the condenser.

2. In absorption refrigerating system, a unitary device comprising an evaporator, an absorber and a cooling chamber, said evaporator and said absorber having surfaces spaced a short distance from one another whereby refrigerant may diffuse from the evaporator surface to the absorber surface and said cooling chamber having a wall in common with a wall of said absorber and means for causing a liquid to trickle downwardly over said common wall to thereby evaporate and remove heat from the absorber.

3. In an absorption refrigerating system, a combined evaporator, absorber and cooling device for the absorber consisting of two concentrically disposed cylinders connected together at the top and bottom to provide a closed chamber, means for causing liquid refrigerant to trickle down over one wall in said chamber, means for causing absorption liquid to trickle down over another wall in said chamber and means for causing liquid refrigerant passing from a part of said system to the evaporator to pass in heat transfer relation with said last mentioned wall.

4. In an absorption refrigerating system, a condenser, an evaporator, an absorber, a cooling chamber located in proximity to said absorber and in heat exchange relation therewith and means for causing liquid refrigerant passing from the condenser to the evaporator to trickle downwardly through said chamber to remove heat from the absorber.

5. In an absorption refrigerating system, a condenser, an evaporator, an absorber, a cooling chamber located in proximity to said absorber and in heat exchange relation therewith, means for causing liquid refrigerant passing from the condenser to the evaporator to trickle downwardly through said chamber to thereby cause a portion of the refrigerant to evaporate and remove heat from the absorber and means for returning the evaporated portion of the refrigerant to said condenser.

6. In a continuously operable absorption refrigerating system the combination of an evaporator, a condenser, means for maintaining the pressure in said condenser higher than that prevailing in the evaporator during operation, an absorber, a cooling chamber associated therewith, means for causing liquid refrigerant to flow from the condenser to said chamber and to trickle downwardly therethrough to thereby cause a portion of said refrigerant to evaporate, means for returning the evaporated portion to the condenser and means operable due to the difference in pressure between said condenser and said evaporator for conveying the unevaporated portion of the refrigerant from the chamber to the evaporator.

7. The method of cooling the absorber of an absorption refrigerating system having a condenser and an evaporator which includes the steps of conducting liquid refrigerant from the condenser to a vessel having surfaces therein in heat transfer relation with said absorber, allowing the liquid refrigerant to trickle downwardly over said surfaces to absorb heat from the absorber and thereby cause a portion of said refrigerant to evaporate, returning the evaporated portion to the condenser and conducting the remainder to the evaporator.

8. The method of cooling the absorber of an absorption refrigerating system having a condenser and an evaporator which includes the steps of conducting liquid refrigerant from the condenser to a vessel in heat transfer relation with the absorber, allowing the liquid refrigerant to trickle downwardly through said vessel to absorb heat from the absorber, air cooling said liquid to cause the heat taken from the absorber to be dissipated to the air and conducting said liquid to the evaporator.

9. The method of cooling the absorber of an absorption refrigerating system having a condenser and an evaporator which includes the steps of conducting liquid refrigerant from the condenser to a vessel in heat transfer relation with the absorber, allowing the liquid refrigerant to trickle downwardly through said vessel to absorb heat from the absorber and thereby cause a portion of said refrigerant to evaporate, conducting the unevaporated portion to the evaporator, returning the evaporated portion to the condenser and again condensing the same to thereby dissipate the heat of absorption from the condenser.

KURT V. NESSELMANN.